Patented Sept. 24, 1935

2,015,165

UNITED STATES PATENT OFFICE 2,015,165

GOLF BALL

Douglas Frank Twiss, Wylde Green, Frederick Arthur Jones, Birmingham, and Ernest William Allen, Knowle, England, assignors to Dunlop Rubber Company, Limited, Birmingham, England, a corporation of Great Britain No Drawing. Application November 28, 1933, Serial No. 700,078. In Great Britain November 29, 1932

10 Claims. (Cl. 91—68)

This invention comprises improvements in or relating to a method for providing golf balls with a wear resisting surface.

As is well known, it is customary to cover golf balls with a layer of gutta-percha or a mixture of gutta-percha and rubber, and to apply to this material a final coating of paint or enamel finish to impart an attractive glossy, dirt-repellent, wear-resisting surface.

A surface produced in this way, however, may often depreciate in appearance by flaking.

Furthermore, sulphur-vulcanization of a golf ball shell even with the aid of an ultra-accelerator, frequently leaves the ball in a condition in which the surface refuses to hold the paint satisfactorily.

We are aware that it has already been disclosed to harden the surface of a golf ball or other article consisting essentially of gutta and/or rubber, with or without pigments so as to permit subsequent polishing and to make painting unnecessary.

A painted ball, however, has an advantage in that its durable outer surface can be easily renewed if in any way it becomes impaired during use.

The object of the present invention is to provide golf balls with an improved wear resisting surface in which the degree of attachment of the paint or enamel is considerably enhanced.

According to this invention, we provide the method of increasing the adhesion of paint to unvulcanized or to vulcanized golf ball shells comprising treating the moulded ball with a halogen prior to applying the paint.

Further, the balls may, after the hardening process and before proceeding to painting, be subjected to a polishing operation.

If desired more than one halogen can be employed in admixture or in chemical combination with one another. These can be used in the form of a gas or vapor or dissolved in a solvent such as water, ethylene dichloride, chloroform, glacial acetic acid.

Furthermore, the halogen can be employed in conjunction with a halogen derivative of a non-metallic element such as sulphur.

It may be desirable in certain instances to employ a solvent which will retard the reaction of the halogen or halogens with the gutta-percha and/or rubber as for instance, acetic acid.

If desired a mixture of solvents can be used as for instance the mixture of ethylene dichloride with ethyl acetate or of carbon tetrachloride or carbon disulphide with glacial acetic acid.

The reaction may be stopped by subsequent treatment of the ball with a solution of antichlor such as a solution of sodium thiosulphate, sodium sulphite or sodium nitrite.

The following examples, illustrate how the treatment can be effected:—

Example 1

A moulded golf ball, the shell of which has been vulcanized at low temperature, is immersed in a saturated solution of chlorine in a mixture of glacial acetic acid eighty parts, ethylene dichloride thirty parts, sulphur dichloride one part, for a period of one minute. The period of treatment may be varied, but in general form one-half to five minutes appears to give the best practical results. After treating in this chlorine solution the ball is washed in alcohol for one minute, then in a five to ten per cent solution of an antichlor such as sodium thiosulphate, sodium nitrite, or sodium sulphite for one minute and finally in running water for about thirty minutes. The treated ball may be dried on a cloth and then allowed to stand either at room temperature or at a slightly elevated temperature for about twenty hours in order that any absorbed water or solvent may dry out. The ball is now painted with a high grade golf ball enamel either by hand or machine, or by spraying according to the usual known methods.

Golf balls with a vulcanized cover treated by this method are found to be as readily paintable as unvulcanized moulded golf balls whereas a golf ball with a newly vulcanized cover, but not treated with chlorine mixture cannot be satisfactorily painted, the paint forming a very sticky layer which refuses to spread evenly, or to dry subsequently. The paint shows no deterioration when the ball is stored for one month even at an elevated temperature of 100 to 110° F. The treatment also improves the adhesion of the paint layer to the surface of the golf ball.

Example 2

A moulded golf ball, having a vulcanized cover, is immersed in a saturated solution of chlorine in a mixture of glacial acetic acid eighty parts, ethylene dichloride thirty parts and sulphur dichloride one part for half a minute. The ball is then transferred for a minute to a saturated solution of chlorine in a mixture of glacial acetic acid eighty parts and ethylene dichloride thirty parts and is then washed in alcohol and five per cent sodium nitrite solution for one minute each, and finally in running water for about thirty minutes. After drying for twenty hours at room temperature, the ball is of an attractive white color and paints well. The increase in weight of the ball after the halogen treatment is approximately 0.07 gram, (about 0.15%).

Example 3

An unpainted golf ball having a vulcanized shell, is immersed for two minutes in a saturated solution of chlorine in a mixture of glacial acetic acid eighty parts and ethylene dichloride thirty parts. After treatment the ball is washed for two minutes in alcohol, two minutes in a five to ten per cent aqueous solution of sodium nitrite and thirty minutes in running water. The ball is dried on a towel and allowed to stand for about twenty hours at room or slightly elevated temperature. The increase in weight of the ball by this treatment is about 0.05 gram (approximately 0.11%) and the color of the ball is improved, a desirable whiteness being imparted by the chlorine treatment; also the surface is hardened and quite free from any of the slight tackiness associated with an untreated ball. The dried golf ball is readily painted either by hand or machine, or sprayed in known manner.

Example 4

Two moulded golf balls having an unvulcanized shell of a mixture of gutta-percha and rubber are immersed in a saturated solution of chlorine in a mixture of glacial acetic acid eighty parts, ethylene dichloride thirty parts, and sulphur dichloride one part for two and one-half minutes. The treated balls are then washed in alcohol for two and one-half minutes followed by immersion in a five to ten per cent solution of sodium thiosulphate for two and one-half minutes and finally washed for about thirty minutes in running water. After air drying for fifteen to twenty hours, one golf ball is polished with a soft cloth using a little polishing powder such as whiting, titanium white, kieselguhr or tin oxide; a good polish is thus obtained. The other ball is not polished. Both balls are then painted with a high grade golf ball paint in known manner. After drying, the adhesion of the paint to the surface of the balls is much greater than that obtained with a ball which had not been treated with the halogen solution.

Example 5

A moulded golf ball having a vulcanized shell composed of a mixture of gutta-percha and rubber is immersed for four minutes in a saturated solution of chlorine in a mixture of glacial acetic acid eighty parts by volume and ethylene dichloride thirty parts. The ball is then washed in alcohol followed by immersion for about four minutes in a ten per cent solution of sodium nitrite which also contains about five per cent of concentrated ammonia solution. The ball is finally washed in running water for about thirty minutes. After air drying as previously described, the ball is painted in known manner. If five per cent of a partly chlorinated diphenyl (known commercially as "Arochlor 4465") is added to the chlorine solution before treatment of the ball, the surface of the painted ball shows very little cracking after play.

Example 6

A dozen golf balls having shells composed of a mixture of gutta percha and rubber are covered with a solution of known strength of chlorine in water. The chlorine solution is first prepared by nearly saturating water with gaseous chlorine and the actual concentration determined by titration.

A volume of this solution is taken which contains exactly 0.792 gram of chlorine (that is 0.066 gram of chlorine per ball) and the golf balls are immersed in this solution for twenty-four hours, water being added if necessary so that the balls are completely covered with chlorine solution. After treatment, the balls are dried in air and painted in the usual manner by hand, machine or spraying. The golf ball shells absorb practically the whole of the chlorine from solution during the twenty-four hours' treatment.

Example 7

Golf balls are exposed for periods of eight, sixteen and twenty-four hours to a mixture of ethylene dichloride vapor and chlorine at atmospheric pressure and 20° C. The total pressure is composed of the partial pressure of the saturated vapor of ethylene dichloride and the remainder of the chlorine gas. After treatment the balls are exposed to air for about sixteen hours (e. g. overnight) and are then painted in the usual manner. The finished balls are somewhat comparable with those obtained by the process given in Example 6.

In the above examples, chlorine has been used as a halogen, it being in general most convenient and readily available. However, it will be understood that other halogens, such as bromine, might be used in treating the golf balls.

Having described our invention, we claim:—

1. A golf ball having a gutta containing cover the outer surface of which is halogenated.

2. A golf ball having a gutta containing cover the outer surface of which is chlorinated.

3. A golf ball having a gutta containing cover the outer surface of which is halogenated and painted.

4. A golf ball having a gutta containing cover the outer surface of which is chlorinated and painted.

5. A method of treating gutta containing covers of golf balls which comprises contacting the outer surface of said covers with a halogen dissolved in a solvent which retards the action of said halogen.

6. A method of treating gutta containing covers of golf balls which comprises contacting the outer surface of said covers with a halogen while terminating the action of said halogen after a definite period of time by a reducing agent.

7. A method of treating gutta containing covers of golf balls which comprises contacting the outer surfaces of said covers with a halogen dissolved in a solvent comprising a large proportion of acetic acid and limiting the action of said halogen.

8. A method of treating gutta containing covers of golf balls which comprises contacting the outer surfaces of said covers with a halogen, and stopping the action of said halogen at a definite time interval by an anti-chlor.

9. A method of treating a golf ball cover to form a paint receptive coating which comprises treating the outer surface of said cover with a halogen dissolved in a solvent comprising ethylene dichloride and acetic acid, and terminating the action of said halogen when the surface of said ball has become paint receptive but before the halogen has penetrated substantially below the surface of said cover.

10. A method of treating a golf ball cover to provide a paint receptive surface which comprises treating the outer surface of said cover with a solution of a halogen in a solvent comprising acetic acid, ethylene dichloride and a small quantity of chlorinated diphenyl until the surface of said cover has become paint receptive, and terminating said treatment before the halogenizing action has penetrated substantially below the surface of the ball.

DOUGLAS FRANK TWISS.
FREDERICK ARTHUR JONES.
ERNEST WILLIAM ALLEN.